United States Patent
Litschel et al.

[11] Patent Number: 6,109,922
[45] Date of Patent: *Aug. 29, 2000

[54] DEVICE FOR REPRESENTING RELIEF ITEMS

[75] Inventors: Dietmar Litschel, Klosterneuburg; Christoph Schwertner, Katzelsdorf, both of Austria

[73] Assignee: Caretec GmbH, Vienna, Austria

[*] Notice: This patent issued on a continued prosecution application filed under 37 CFR 1.53(d), and is subject to the twenty year patent term provisions of 35 U.S.C. 154(a)(2).

[21] Appl. No.: 08/776,541
[22] PCT Filed: Aug. 3, 1994
[86] PCT No.: PCT/AT94/00106
§ 371 Date: Jan. 29, 1997
§ 102(e) Date: Jan. 29, 1997
[87] PCT Pub. No.: WO96/04637
PCT Pub. Date: Feb. 15, 1996

[51] Int. Cl.[7] .................................................. G09B 21/00
[52] U.S. Cl. ................ 434/114; 434/113; 340/825.19; 400/124.14
[58] Field of Search .................... 434/112–115, 117, 434/118; 400/124.14; 340/825.19; 341/21

[56] References Cited

U.S. PATENT DOCUMENTS

| | | | |
|---|---|---|---|
| 2,915,874 | 12/1959 | Ferguson, Jr. ................ | 434/113 X |
| 3,659,354 | 5/1972 | Sutherland ................... | 434/113 |
| 3,740,446 | 6/1973 | Benson ........................ | 35/35 |
| 3,866,020 | 2/1975 | Charlesworth ............... | 235/611.11 D |
| 4,586,904 | 5/1986 | Chlumsky ..................... | 434/114 |
| 5,195,894 | 3/1993 | Le Blanc et al. ............ | 434/114 |
| 5,222,895 | 6/1993 | Fricke ......................... | 434/113 |
| 5,429,507 | 7/1995 | Kaplan ........................ | 434/112 |
| 5,449,292 | 9/1995 | Tani et al. ................... | 434/114 |
| 5,522,728 | 6/1996 | Kaplan ........................ | 434/112 |
| 5,580,251 | 12/1996 | Gilkes et al. ................ | 434/113 |
| 5,718,588 | 2/1998 | Tretiakoff et al. ........... | 434/114 |
| 5,766,013 | 6/1998 | Vuyk ........................... | 434/114 |

FOREIGN PATENT DOCUMENTS

| | | | |
|---|---|---|---|
| 2484114 | 6/1980 | France ................ | G09B 21/02 |
| 3035852 | 5/1982 | Germany .............. | G09B 21/02 |
| 3042390 | 6/1982 | Germany .............. | G09B 21/02 |
| 3044599 | 7/1982 | Germany .............. | G09B 21/02 |
| WO 92015079 | 9/1992 | Germany .............. | G09B 21/00 |
| 405150714 | 6/1993 | Japan ................. | G09B 21/00 |
| 0875440 | 10/1981 | U.S.S.R. ............. | G09B 21/02 |
| 1460-734 | 2/1989 | U.S.S.R. . | |
| 2153576 | 1/1984 | United Kingdom .... | G09B 21/00 |

OTHER PUBLICATIONS

IBM Technical Bulletin, Bd. 28, No. 3, Aug. 1985, "Seeing Eye Mouse." pages 1343 and 1344.

*Primary Examiner*—Joe H. Cheng
*Attorney, Agent, or Firm*—Dykema Gossett PLLC

[57] ABSTRACT

An apparatus for conveying information includes a perforated plate having a plurality of circular openings; at least one pin (5, 15, 25, 25, 35, 45, 55, 65, 75, 85) which is axially movable to project through and above a respective circular opening, an electromagnetic actuator (6, 16, 66, 116) for moving the pin (5, 15, 25, 25, 35, 45, 55, 65, 75, 85), and a permanent magnet for retaining the pin in at least two stable positions.

8 Claims, 4 Drawing Sheets

DEVICE FOR REPRESENTING RELIEF ITEMS

FIELD OF THE INVENTION

The invention relates to a device for representing relief items which includes a perforated plate and at least one pin which is axially movable in one of the perforations in the plate to be detected. Such devices are used in particular as display devices which are detectable in a tactile manner, with the help of which blind persons can detect information. Generally, braille printing is used in which every letter of the alphabet is represented by a matrix of 2×3 or 2×4 dots which are placed or not placed. The placement of a dot occurs in such a way that the pertinent pin is moved out of the corresponding drilling, as a result of which it can be detected with the fingers. However, the invention relates similarly to graphical display devices with which random patterns, images or displays can be reproduced in a manner so as to be detectable in a tactile way. In such displays it is also possible to provide different positions of the pins, so that relief-like representations are possible. The important aspect is that the representation is transient, which means that the display can be changed at will.

STATE OF THE ART

Display devices are known in which the position of each pin is stable, which is effected in such a way for example that this pin is pressed by a spring against a stop. By activating an actuator such as an electromagnet it is possible to bring this pin into its other position, i.e. it can be extended. As long as this pin is extended it is necessary that the actuator exert pressure on the pin to hold it in this position. Such devices have a high power consumption and the occurring thermal problems cause a complex production and arrangement of these devices.

Furthermore, display devices are known which provide a locking device which holds the associated pin in its position which is not stable per se. Such devices are highly complicated from a mechanical viewpoint, complex in production and susceptible to faults.

It is the object of the present invention to avoid such disadvantages and to provide a device of the kind mentioned above which comes with a simple arrangement, provides a low power consumption and nevertheless guarantees sufficient holding forces for each pin, thus allowing detection with the finger without giving rise to the danger that individual pins are thus brought into another position, resulting in a falsification of the represented information.

BRIEF OUTLINE OF THE INVENTION

These objects are achieved by a device wherein each pin is provided with a position in which the tip of the pin is substantially arranged in the plane of the surface of the perforated plate and a further position in which it projects outwardly to such an extent that it is clearly scannable by the finger of the user. If, as mentioned above, a relief-like display is necessary there are additional further positions in which the pin projects to a different extent. The important aspect is that the pin is held in each of the stable positions by magnetic forces of attraction. These can occur between a permanent magnet and a part of soft iron or also between two permanent magnets which are polarised correspondingly.

It has proved to be particularly advantageous to provide axially magnetisable segments in each pin. A pertinent perforated plate acts as a magnetic yoke in order to bring about a closed magnetic circulation. In this way it can be achieved that the pin is held in its stable positions only by the magnetic forces. Despite the stability of the position it is still provided with a certain resilient mobility in the axial direction. This has proved to be a feature which is particularly appreciated by users and enhances the operating convenience.

In a particularly preferable embodiment of the present invention it is provided that each pin is provided with at least two, preferably three segments which are permanently magnetised in the axial direction and are arranged flush behind one another in the axial direction and are separated from one another by soft iron segments. The magnetised segments are magnetised alternatingly opposite to one another. A soft magnetic perforated plate is provided which in the zone of each pin is provided with two annular recesses which are arranged in such a way that at least in one stable position of the pin two magnetic segments of the associated pin are substantially arranged in the centre of the two annular recesses. This leads to a particularly strong holding force in the extended position of the pins, so that in this position two permanently magnetised segments form two magnetic circulations. The third permanent magnet is used to receive the forces of the electromagnetic actuator.

The deletion of the entire display is a frequently occurring process in any kind of display device. This process can be simplified and accelerated in such a way that a common actuator is provided which acts upon all pins simultaneously.

A particularly preferable embodiment of the invention consists of the fact that the perforated plate is arranged as the face surface of a cylindrical disc, with the individual pins being arranged on concentric circles. When this disc is rotated about its central point, the characters represented by the pins glide below the stationary hand of the user according to the rotation. This provides a particular convenience in the use of the device.

SHORT DESCRIPTION OF THE DRAWINGS

FIG. 1 schematically shows an axonometric representation of a device in accordance with the invention;

DETAILED DESCRIPTION OF THE PREFERRED EMBODIMENTS

Figure 1:
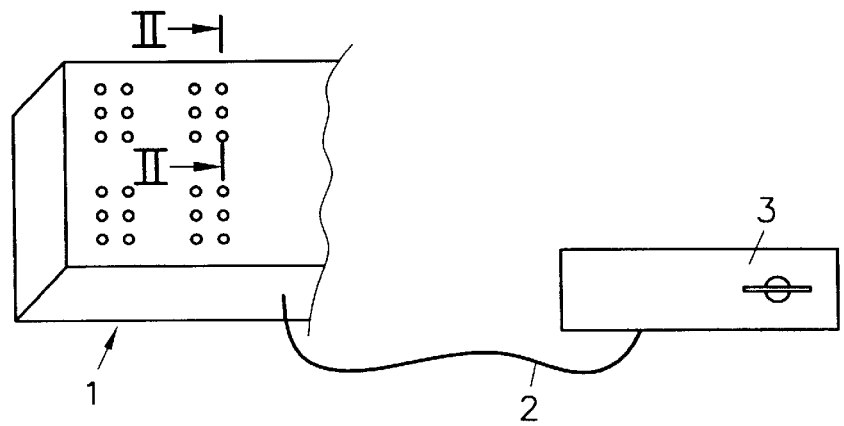

The device 1 in accordance with the invention as schematically shown in FIG. 1 is connected to a computer 3 by way of a cable 2. It controls the device 1 as an output unit such as a screen. The computer 3 can represent the control device in this respect.

Figure 2:
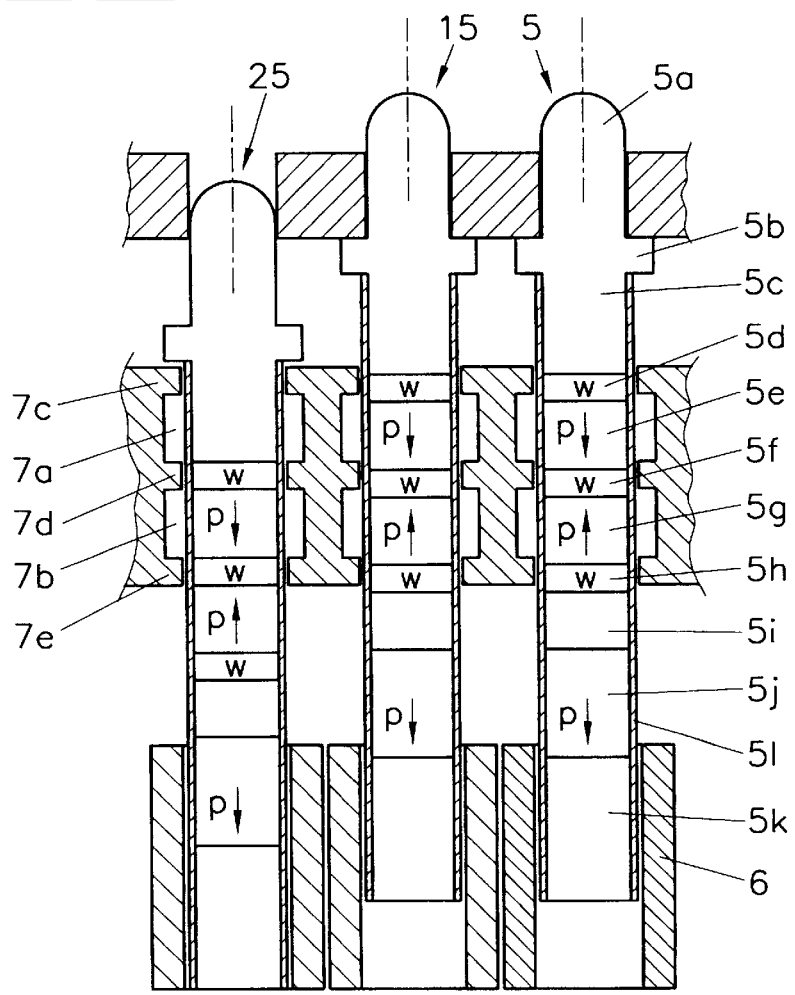
FIG. 2 shows a partial sectional view along a plane according to line II—II in FIG. 1 which is established by the axes of a part of the pins.

FIG. 2 shows a first embodiment in a more detailed partial sectional view. The top cover of the device 1 is formed by a perforated plate 4, through which project the pins 5, 15 and 25. Each pin 5, 15, 25 consists of a head 5a, a projection 5b, an upper shaft segment 5c, a first soft iron segment 5d, a first permanent magnet 5e, a second soft iron segment 5f, a second permanent magnet 5g, a third soft iron segment 5h, a spacer element 5i, a third permanent magnet 5j and a lower shaft segment 5k. These parts are arranged behind one another in the axial direction and are mutually connected by gluing, for example. The head 5a, the projection 5b, the spacer element 5i as well as the upper and the lower shaft segment 5c and 5k are made from non-magnetic material, e.g. plastic or non-ferrous heavy metal. The parts below the projection 5b are additionally enclosed by a sleeve 51 which is also made from plastic or non-ferrous heavy metal. As is shown in FIG. 2 by arrows, the first permanent magnet 5e and the third permanent magnet 5j are magnetised in the same direction, whereas the second permanent magnet 5g is polarised in the opposite direction.

The pins 5, 15 and 25 are movable in the axial direction between two end positions. In the upper end position the projection 5b rests on the lower side of the perforated plate 4 and a certain initial tension is produced by the magnetic force. In an alternative embodiment it may be provided, however, that a certain gap exists between the projection 5b and the perforated plate 4 in the upper end position, so that the pin 5, 15, 25 can move freely around its end position to a certain extent without leaving it. The soft magnetic perforated plate 7 is made up of a magnetisable material such as soft iron. Two annular recesses 7a and 7b are provided in the zone of each drilling of the perforated plate 7, which recesses are delimited by projections 7c, 7d and 7e. The distance between the projections 7c and 7d as well as 7d and 7e in the axial direction substantially corresponds to the distance between the first soft iron segment 5d and the second soft iron segment 5f and between the second soft iron segment 5f and the third soft iron segment 5h. The amount of possible axial displacement of the pins 5, 15 and 25 is adjusted in such a way that in the upper end position, which is represented in FIG. 2 by the pins 5 and 15, two magnetic circulations are formed. The first permanent magnet 5e forms a magnetic circulation around the annular recess 7a and the second permanent magnet 5g forms a magnetic circulation around the second recess 7b. In the lower end position, which is represented in FIG. 2 by pin 25, the first permanent magnet 5e forms a magnetic circulation around the second recess 7b.

The soft iron segments 5d and 5f are situated approximately at the same level and opposite to the projections 7c, 7d and 7e in the two end positions. Any movement of the pin in the axial direction increases the magnetic gap between these parts and is therefore only possible against the resistance of the magnetic forces. That is why the pins 5, 15 and 25 are kept in these positions in a stable manner.

An electromagnet 6 is provided below the soft magnetic perforated plate 7 in the zone of each pin 5, 15, 25, as a result of whose activation the third permanent magnet 5j can be attracted or repelled. It is therefore possible, by a respective control of these electromagnets 6, to bring the pins 5, 15, 25 into the respective other position.

Figure 3:
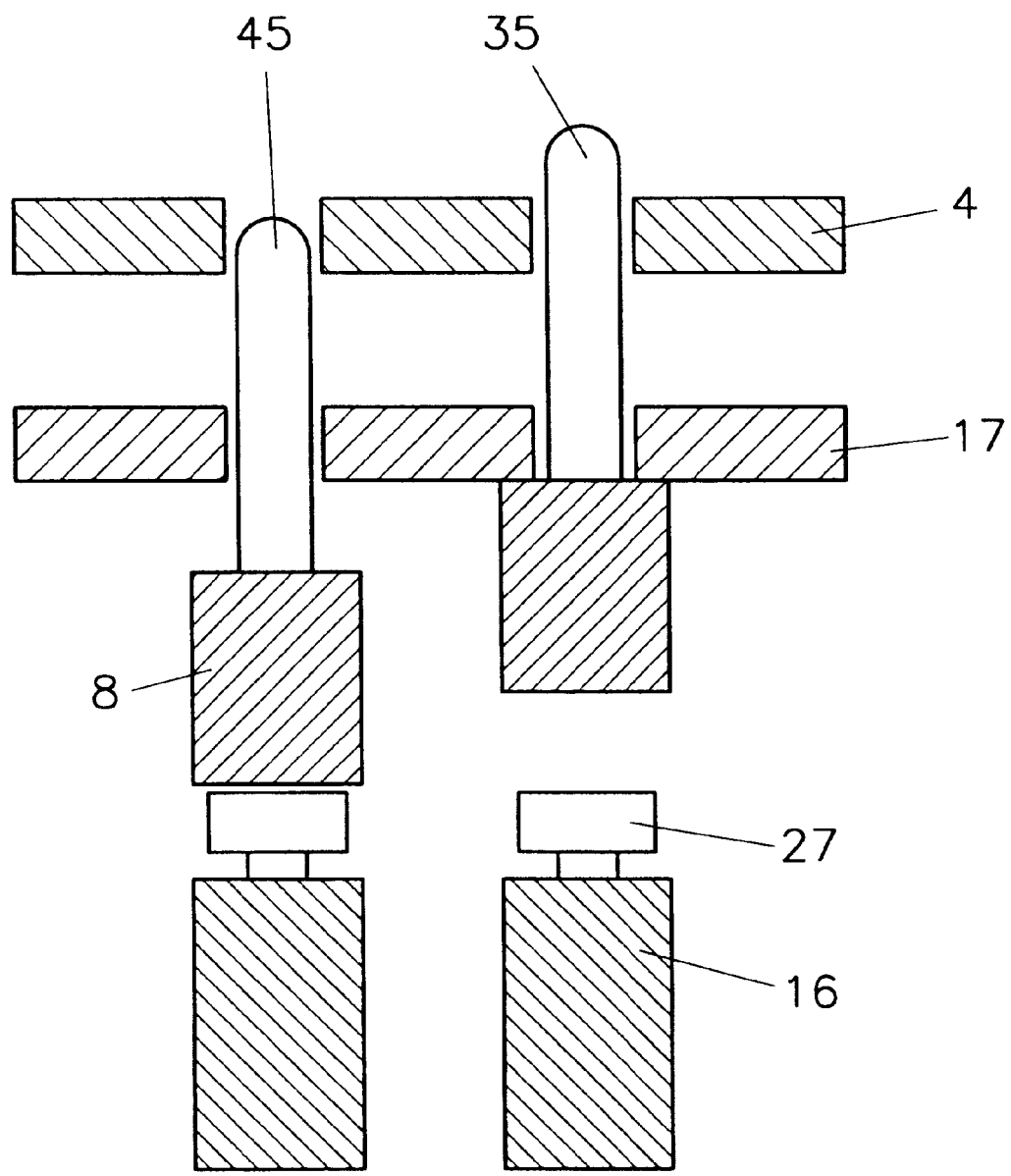
FIG. 3 shows a further embodiment of the invention in a sectional view.

FIG. 3 shows a simplified embodiment of the invention. Permanent magnets 8 are attached at the lower side of the pins 35 and 45. A soft magnetic perforated plate 17 limits the movement of the pin in the upper end position of pin 35. As a result of the respective force of attraction this position is stable. The permanent magnet 8 is attracted and tightly held by a soft iron plate 27 in the lower end position of pin 45. An electromagnet 16 is provided below the soft iron plate 27 for controlling the pin 35, 45.

Figure 4:
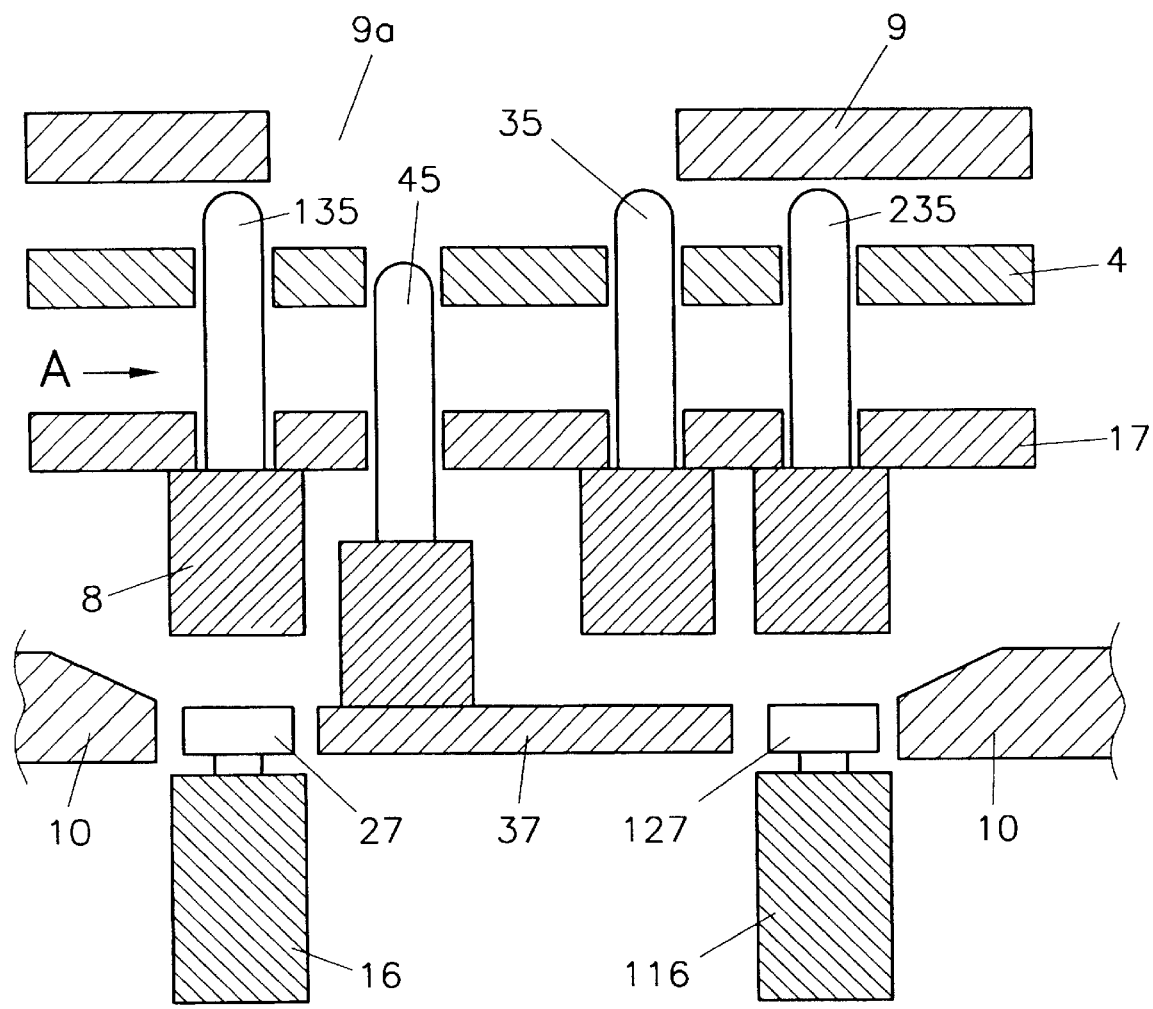
FIG. 4 shows a third embodiment of the invention in a sectional view.

FIG. 4 is an extension of the embodiment of FIG. 3, in which the module, consisting of the pins 35, 45 plus permanent magnet 8 of perforated plate 4 and the soft magnetic perforated plate 17, is movably arranged in a direction parallel to the surface of the perforated plate 4. This movement can be translational or rotational. A cover plate 9 is provided above the pins 35, 45 which is provided with a reading window 9a through which the position of a part of the pins 35, 45 can be scanned. The "non visible" pins below the cover plate 9 are always in their upper end position in this embodiment. Conversely, the device can also be arranged in such a way that the pins are brought to their lower end position after leaving the reading window. Before a pin reaches the reading window 9a, it is pulled downwardly by electromagnet 16, if necessary. In case of a movement of the pins in the direction of arrow A this means that the pin 135 is optionally to be pulled downwardly by the electromagnet 16, and retained in a downward position by soft iron plate 37. After leaving the display window 9a the pin 235, if it were in the lower end position, could be brought back again to its upper end position by the soft iron plate of electromagnet 116. This, however, is not necessary because a wedge-like ramp 10 is provided which automatically brings the pins which are situated in their lower end position into the upper end position. The electromagnet 116 is relevant, however, when the perforated plate 4 is to be moved in the opposite direction, against the arrow A. As a result of this embodiment it is possible to actuate a plurality of pins with only one or two electromagnets 16, 116.

Figure 5:
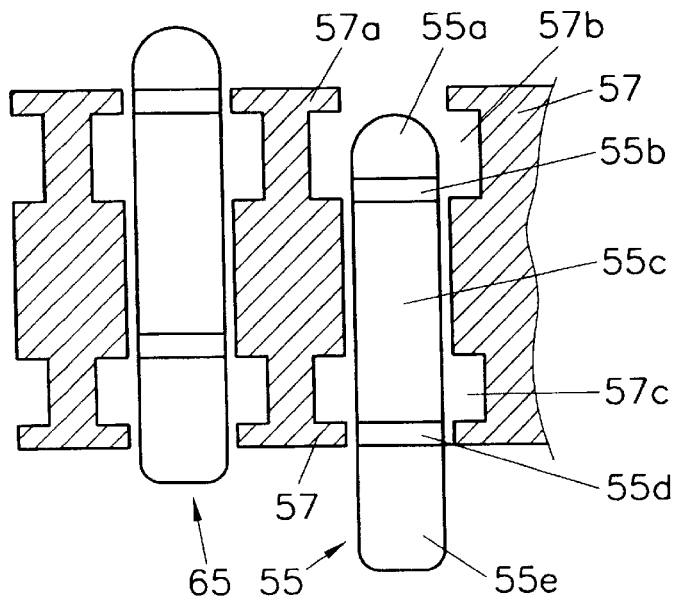
FIG. 5 shows a fourth embodiment of the invention in a sectional view.

FIG. 5 shows an embodiment which represents a modification of the embodiment of FIG. 2, but which is substantially simplified. The pin 55 consists of a tip 55a made from plastic, an upper soft iron segment 55b, a permanent magnet 55c, a lower soft iron segment 55d and a shaft 55e. Only one single perforated plate 57 is provided whose surface simultaneously forms the top cover of the device. The upper soft iron segment 55b is arranged in the upper end position opposite to a projection 57a of the perforated plate 57. In the lower end position the lower soft iron segment 55d is arranged opposite to a projection 57d of the perforated plate 57. An electromagnet (not shown) for actuating the pins 55, 65 is provided below the perforated plate 57. The recesses 57b and 57c are used for producing the magnetic circulations such as in the embodiment of FIG. 2.

Figure 6:
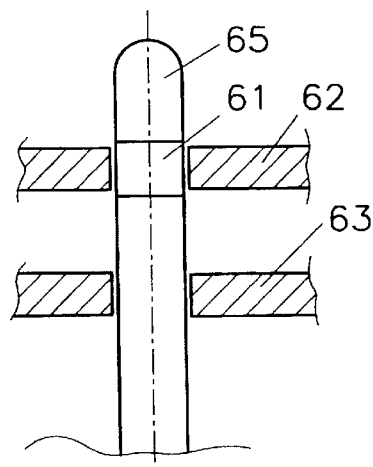
FIG. 6 shows an altered arrangement of the pins.

FIG. 6 shows a further embodiment wherein the pins 65 are provided with at least one magnetic segment 61. Furthermore, magnetic plates 62 and 63 are provided which cooperate with the magnetic segment 61. In this embodiment the magnetic segment 61 can be permanently magnetic and the magnetic plates 62 and 63 can be soft magnetic or vice-versa. It is also possible that all these parts can be permanent magnets. In this case it is important that the forces acting in the end positions are forces of attraction. The direction of magnetisation can be transverse to the axial direction of the pins 65.

Figure 7:
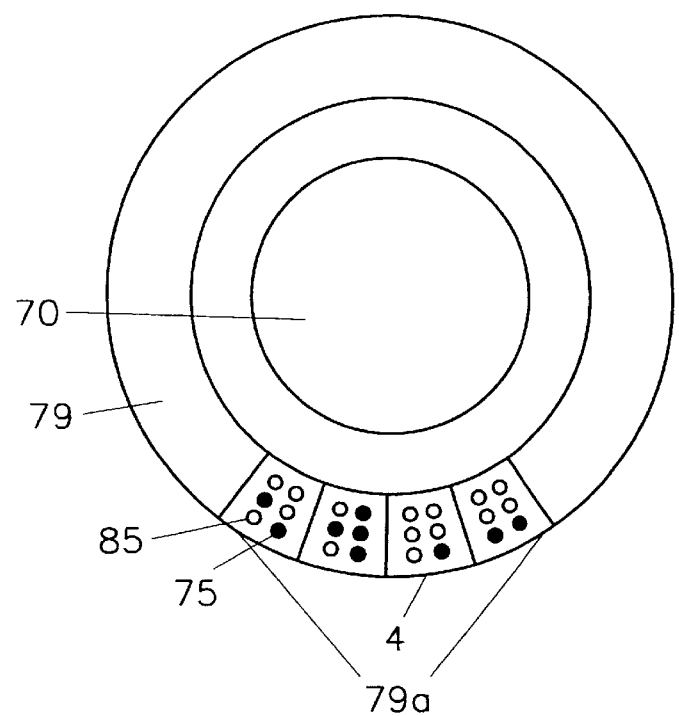
FIG. 7 shows a top view of an embodiment of the device in accordance with the invention.

FIG. 7 shows a particularly ergonomic embodiment of the invention. The actuation of the pins 75 (set) and 85 (not set) can occur in accordance with one of the modifications as described above. A support surface 70 is provided on the upper side of the device for the hand of the user, with a cover 79 being provided on its circumference. This cover 79 is provided with a display window 79a in the form of a segment of an annulus. Below the cover 79 a perforated plate 4 is rotatably arranged. Pins 75, 85 project through its drillings. The condition of the pins 75, 85 can be scanned in the area of the display window 79a. Otherwise they are covered by the cover 79. In this manner the information to be read slides under the substantially unmoved hand of the user. It may be provided that the speed of rotation of the perforated plate 4 can be influenced by the user.

What is claimed is:

1. An apparatus for representing relief items, comprising:
   a first perforated plate which is rotatable about an axial center thereof and which defines an upper surface and a plurality of circular openings therethrough arranged in concentric radial circles,
   a cover plate positioned above said perforated plate, said cover plate providing a reading window therein for exposing a portion of said perforated plate therebelow,
   a pin which is mounted beneath said perforated plate and rotatable therewith, said pin being axially movable between a first position wherein an upper end thereof is positioned below said upper surface of said perforated plate and a second position wherein said upper end thereof is positioned above said upper surface of said perforated plate,
   a permanent magnet for retaining said pin in one of said first and second positions, and
   an actuator located beneath said perforated plate for moving said pin between said first and second positions when not exposed by said reading window.

2. An apparatus according to claim 1, wherein said actuator comprises an electromagnet.

3. An apparatus according to claim 1, wherein said actuator comprises a wedge-shaped ramp.

4. An apparatus according to claim 1, including a spring which moves said pin in an axial direction thereof.

5. An apparatus according to claim 1, wherein said pin includes a permanent magnet and wherein said actuator comprises a second perforated plate which is magnetic and cooperates with said permanent magnet of said pin to axially move said pin.

6. An apparatus according to claim 1, including a respective pin for each circular opening in said perforated plate.

7. An apparatus according to claim 1, wherein said actuator comprises a carriage which is movable transversely to an axis of said pin to move said pin to a specific position.

8. An apparatus for representing relief items, comprising:
   a first perforated plate which is rotatable about an axial center thereof and which defines an upper surface and a plurality of circular openings therethrough arranged in concentric radial circles,
   a cover plate positioned above said perforated plate, said cover plate providing a reading window therein for exposing a portion of said perforated plate therebelow,
   a pin which is mounted beneath said perforated plate and rotatable therewith, said pin being axially movable between a first position wherein an upper end thereof is positioned below said upper surface of said perforated plate and a second position wherein said upper end thereof is positioned above said upper surface of said perforated plate,
   a permanent magnet for retaining said pin in one of said first and second positions, and
   an actuator located beneath said perforated plate for moving said pin between said first and second positions when not exposed by said reading window, said actuator comprising an electromagnet to move said pin from said second position to said first position and a wedge-shaped ramp to move said pin from said first position back to said second position.

* * * * *